US007623507B2

(12) United States Patent
Hocevar et al.

(10) Patent No.: US 7,623,507 B2
(45) Date of Patent: Nov. 24, 2009

(54) METHOD AND SYSTEM FOR INTERWORKING BETWEEN VIDEO COMMUNICATION TERMINALS

(75) Inventors: Marko Hocevar, Velika Gorica (HR); Keijo Laiho, Masala (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1129 days.

(21) Appl. No.: 10/516,812

(22) PCT Filed: Jun. 4, 2003

(86) PCT No.: PCT/FI03/00443

§ 371 (c)(1),
(2), (4) Date: Dec. 4, 2004

(87) PCT Pub. No.: WO03/103243

PCT Pub. Date: Dec. 11, 2003

(65) Prior Publication Data

US 2005/0193420 A1    Sep. 1, 2005

(30) Foreign Application Priority Data

Jun. 4, 2002    (FI) .................................. 20021067

(51) Int. Cl.
*H04L 12/66* (2006.01)
(52) U.S. Cl. ................... 370/352; 370/282; 370/466; 379/220.01; 379/221.02; 709/231; 725/74; 725/78; 725/80; 725/120
(58) Field of Classification Search ................. 370/241, 370/282, 328, 331, 352, 356, 466; 379/220.01, 379/221.02; 709/231; 725/120, 74, 78, 80
See application file for complete search history.

(56) References Cited

U.S. PATENT DOCUMENTS

| | | | | |
|---|---|---|---|---|
| 6,826,272 B1 * | 11/2004 | Dalrymple et al. | ..... | 379/220.01 |
| 6,885,658 B1 * | 4/2005 | Ress et al. | ................. | 370/352 |
| 6,937,598 B1 * | 8/2005 | Hagirahim et al. | ......... | 370/356 |
| 6,977,911 B1 * | 12/2005 | Geen et al. | ................... | 370/328 |
| 7,031,279 B2 * | 4/2006 | Lee et al. | ..................... | 370/331 |
| 7,043,749 B1 * | 5/2006 | Davies | ....................... | 725/120 |
| 7,272,135 B1 * | 9/2007 | Ohtsu et al. | ................ | 370/356 |
| 7,355,988 B1 * | 4/2008 | Denbar et al. | .............. | 370/282 |
| 2002/0018445 A1 * | 2/2002 | Kobayashi | .................. | 370/241 |
| 2002/0061100 A1 * | 5/2002 | DiCamillo et al. | ..... | 379/221.02 |

(Continued)

FOREIGN PATENT DOCUMENTS

EP    1 202 522 A    5/2002

(Continued)

OTHER PUBLICATIONS

"H.323-H.324 interworking" ITU-T Recommendation H.246: Annex F, Jul. 2001, pp. 1-14, XP002252008 the whole document.

(Continued)

*Primary Examiner*—Gerald Gauthier (57) ABSTRACT

The present invention relates in general to video communication networks and more specifically to a method for interworking between a number of video communication terminals, to a video communication system, and to a video interactive gateway unit. The solution according to the present invention makes it possible to interwork between different terminals e.g. between a low bit-rate multimedia terminal and a packet based multimedia terminal.

29 Claims, 7 Drawing Sheets

U.S. PATENT DOCUMENTS

2008/0059647 A1* 3/2008 Jabri et al. .................. 709/231

FOREIGN PATENT DOCUMENTS

WO        WO 00 76107 A     12/2000

OTHER PUBLICATIONS

Bogen M et al: "Desktop Video: Building large-Scale Services with Incompatible Products" 8TH Joint European Networking Conference JENC8, May 12, 1997, pp. 922-1-922-9, XP002252009 Edinburgh abstract;figures 1,3,4.

K Singh et al: "Interworking between SIP/SDP and H.323" in Proceedings of the $1^{st}$ IP- Telephony Workshop (IPTEL 2000) Apr. 2000, pp. 1-21, XP002252010 Berlin p. 9-p. 13 abstract; figures 2-6.

* cited by examiner

METHOD AND SYSTEM FOR INTERWORKING BETWEEN VIDEO COMMUNICATION TERMINALS

TECHNICAL FIELD OF THE INVENTION

The present invention relates in general to video communication networks and more specifically to a method for interworking between a number of video communication terminals, to a video communication system, and to a video interactive gateway unit.

BACKGROUND OF THE INVENTION

The background of the invention is discussed briefly in the following.

Video Interactive Gateway (VIG) makes it possible for interworking between low bit-rate multimedia terminals (H.324) located in circuit switched telephony network and terminals in IP based multimedia systems (H.323).

Figure 1:
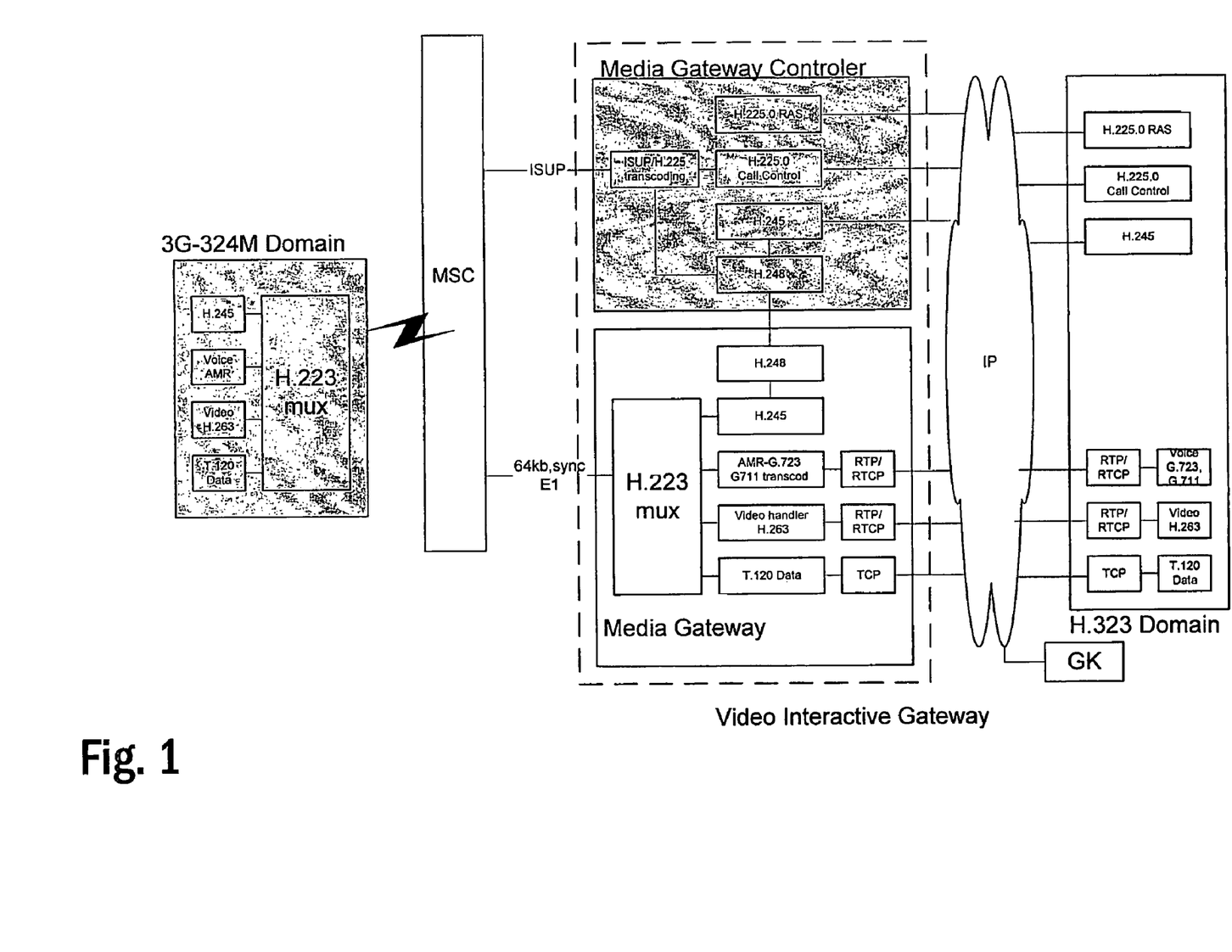
FIG. 1 illustrates a Schemantical Diagram of H.324H.323 interworking according to prior art.

For a better understanding of the prior art relation to the present invention reference will be made to the accompanying figures in which:

FIG. 1 illustrates an Schemantical Diagram of H.324-H.323 interworking according to prior art.

Figure 2:
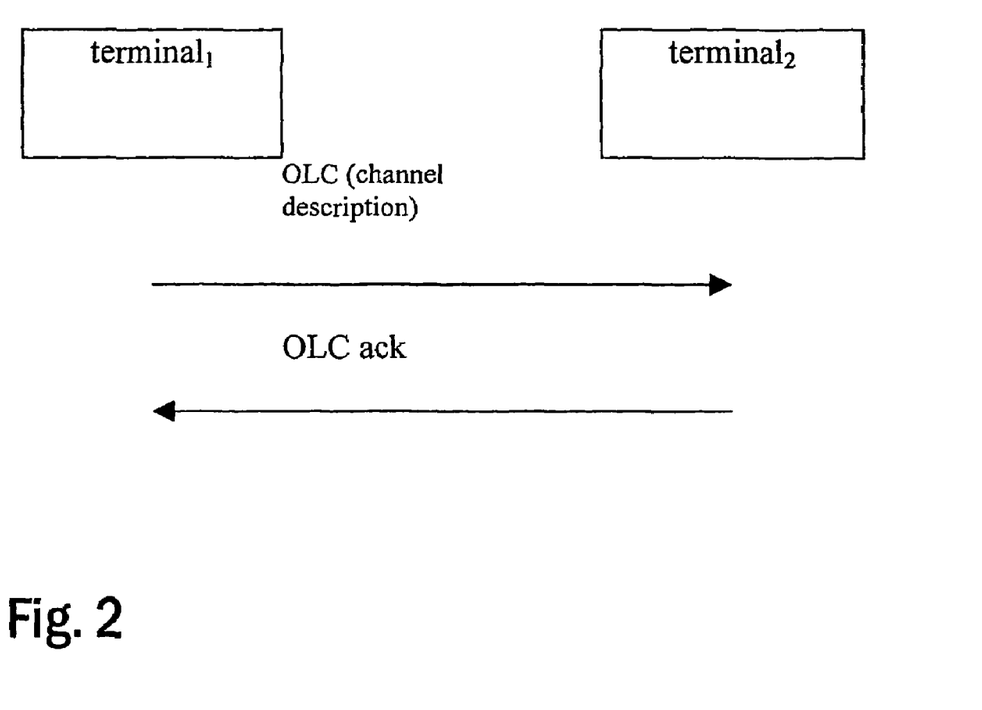
FIG. 2 illustrates Uni-directional Logical Channel signalling procedures according to prior art.

FIG. 2 illustrates Uni-directional Logical Channel signalling procedures according to prior art.

Figure 3:
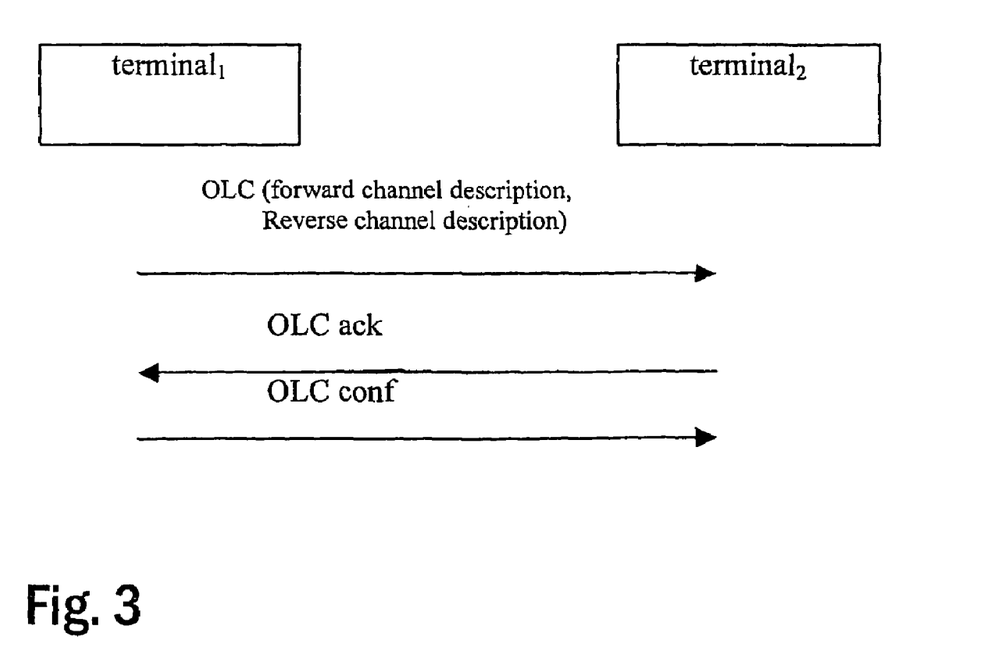
FIG. 3 illustrates Bi-directional Logical Channel signalling procedures according to prior art.

FIG. 3 illustrates Bi-directional Logical Channel signalling procedures according to prior art.

Figure 4:
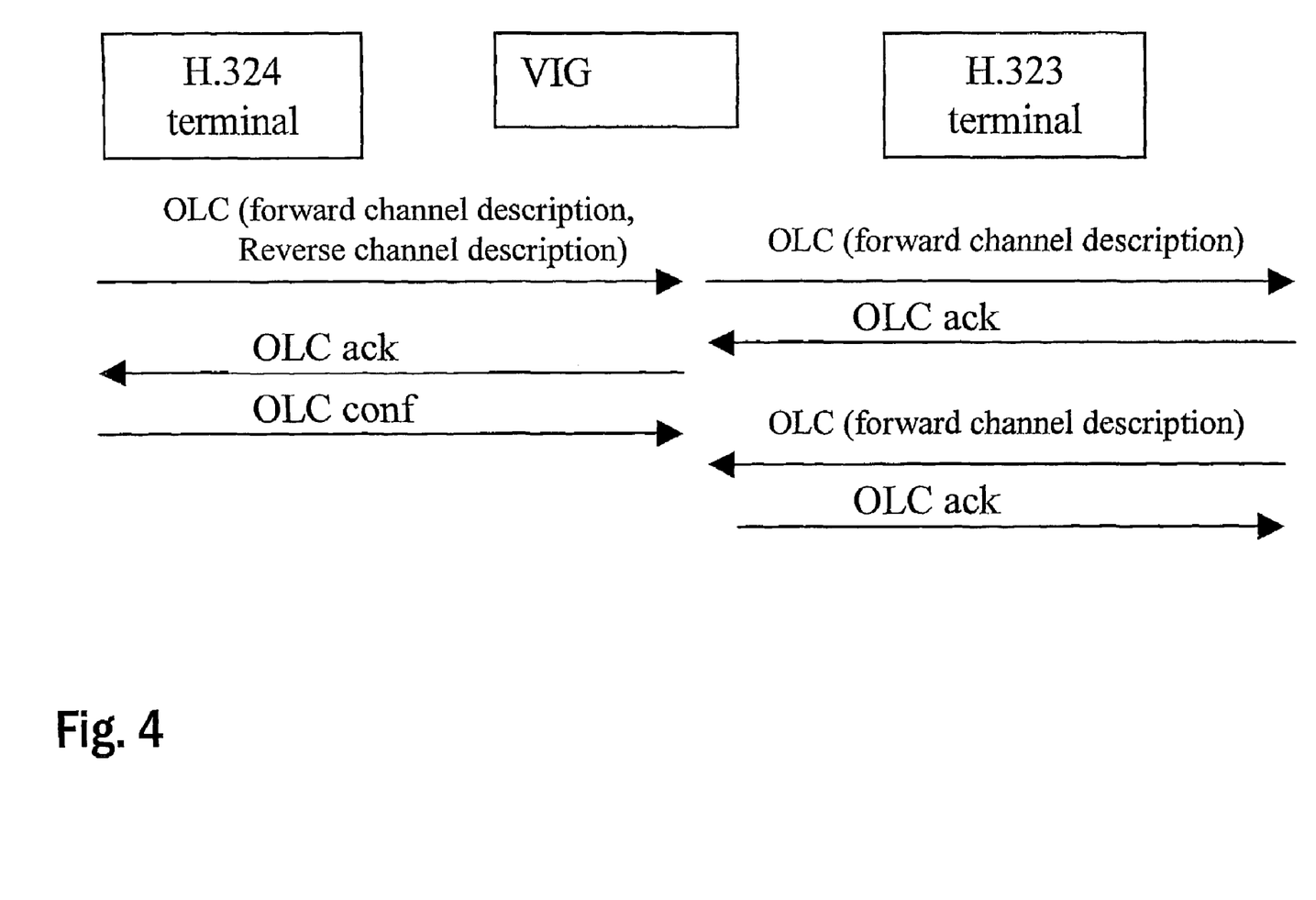
FIG. 4 illustrates Interworking between Bi-directional Logical Channel signalling procedures and Uni-directional Logical Channel signalling procedures according to prior art.

FIG. 4 illustrates Interworking between Bi-directional Logical Channel signalling procedures and Uni-directional Logical Channel signalling procedures according to prior art.

FIG. 1 illustrates an Schemantical Diagram of H.324-H.323 interworking according to prior art. The circuit switched network may use the 64 kbit/s unrestricted digital bearer for the multimedia connection.

Using H.223 as multiplexing protocol different multimedia components, audio, video and data are multiplexed within the bearer. These channels are de-multiplexed by VIG to separate RTP and TCP channels in the IP network, and vice versa. VIG may perform transcoding for different multimedia components if needed to make the communication between end-terminals possible.

ISUP may be used in the circuit switched network as a call control protocol, which is mapped to H.225 protocol in the IP network by VIG.

H.245 is used as a control protocol both in the circuit switched network and in the IP network, providing end to end capability exchange, signalling of command and indications, and messages to open and describe the content of logical channels for different multimedia components.

VIG performs mapping of H.245 messages between circuit switched network and IP network, in order to adapt the different transport protocols and to enable transcoding of media channels.

Further, the interworking capabilities can be used for enabling IP trunking, in case of H.324 to H.324 call. This means that the call is routed to IP-network as close to the terminals as possible. This makes it possible to utilize cheaper transmission costs in the IP network compared to the transmission costs in the ordinary circuit switched telephony network.

As specified in H.245 Open Logical Channel signalling procedures are used for establishing a media channel between terminals. These procedures actually consist of two different procedures, i.e. Uni-directional Logical Channel signalling procedures and Bi-directional Logical Channel signalling procedures.

Uni-directional Logical Channel signalling procedures are used for opening a one-way media channel between the terminals. The originating terminal, which is going to transmit media through the channel, initiates the procedure by issuing Open Logical Channel (OLC) message to remote terminal. The OLC contain description of the media type, the codec to be used, codec options to be used and description of the multiplex layer options to be used, for the channel being opened.

The remote terminal checks if it is able to comply the description of the channel as a receiver. If that is the case it responds with the Open Logical Channel Acknowledge message. When the originating terminal receives the message it can start to transmit the media according to the protocol negotiated in OLC signalling procedure.

FIG. 2 illustrates Uni-directional Logical Channel signalling procedures according to prior art. Bi-directional Logical Channel signalling procedures are used for opening a two-way media channel between the terminals. The channel consists of two uni-directional channels, i.e. forward channel and reverse channel.

The originating terminal, which is going to transmit and receive media through the channels, initiates the procedure by issuing Open Logical Channel (OLC) message to remote terminal. The OLC contain description of the media type, the codec to be used, codec options to be used and description of the multiplex layer options to be used, for the channels being opened both for forward channel i.e. the media which the originating terminal is going to transmit, and for the reverse channel, i.e. for the media which the originating terminal is going to receive.

The remote terminal checks if it is able to comply the description of the channels as a receiver for the forward channel and as a sender for the reverse channel. If that is the case it responds with the Open Logical Channel Acknowledge message.

When the originating terminal receives the message it issues Open Logical Channel Confirm and can start to transmit the media on the forward channel according to the protocol negotiated in OLC signalling procedure. When the terminating terminal receives the message it can start to transmit the media on the reverse channel according to the protocol negotiated in OLC signalling procedures.

Further, H.245 specifies the master slave determination procedure in order to find, which terminal will act as a master and which terminal will act as a slave during the call. This procedure happens in the beginning of the call in order to be able to solve conflicts at logical channel signalling procedure, e.g. both terminals start Bi-directional Logical Channel signalling procedures simultaneously.

FIG. 3 illustrates Bi-directional Logical Channel signalling procedures according to prior art. H.323 specifies that Uni-directional channels are used for audio and video channels. This means that the both terminals are supposed to initiate a uni-directional logical channel signalling procedure to open a channel for the media, which they intend to transmit. H.324 specifies the same for the audio channels. However, it is required that it is mandatory for H.324 terminal to support H.223 adaptation layer 3 for video channel. Since H.223 adaptation layer 3 has bi-directional behaviour, H.324 requires that bi-directional logical channel signalling procedure is used for opening the video channels. In addition to AL3, H.324 terminal may support video channels by using H.223 AL2, which enables to use uni-directional channels.

H.246 specifies the interworking between H.323 and H.324. For Logical Channel Signalling it specifies: "When OpenLogicalChannel (OLC) messages (either unidirectional or bi-directional) are received from the remote endpoint (H.323 or H.324), the gateway should initiate the OLC procedure at the opposite endpoint of the gateway. The Gateway may initiate the OLC procedure before receiving OLC messages."

The problems arising from the background solutions are discussed briefly in the following.

In case call is made between H.324M terminal, which does not support H.223 AL2 for video channels, to H.323 terminal, VIG needs to map bi-directional logical channel signalling procedures used on H.324 side to the uni-directional logical channel signalling procedures used on the H.323. However, this causes potential problems for VIG as seen in FIG. 4.

FIG. 4 illustrates Interworking between Bi-directional Logical Channel signalling procedures and Uni-directional Logical Channel signalling procedures according to prior art. Mapping of the procedures creates two fundamental problems.

VIG receives two descriptions for the channel in direction from H.323 terminal to H.324, one from H.324 terminal as reverse channel description, and another from H.323 terminal as forward channel description. Since the fundamental goal is that VIG do not make any transcoding of adaptation on media when ever possible, this situation creates a problem, when the descriptions received from the different terminals do not match with each other. Further, since different procedures are used for opening of the logical channels, there is no straightforward way to relay terminals to negotiate the used description.

OLC ack and OLC conf messages trigger terminals to start transmission of media. It must be guaranteed that the procedures on the both side of VIG are synchronized so that when VIG receives media from a terminal it is able to transfer media forward to another terminal, in order not to loss the media, since this would be hard to recover by terminals for video channels. It has been noticed that some terminals will crash.

There is a clear need for a solution for interworking between a number of video communication terminals that would make it possible to interwork between different terminals e.g. between a low bit-rate multimedia terminal and a packet based multimedia terminal.

SUMMARY OF THE PRESENT INVENTION

It is an object of the present invention to overcome or at least mitigate the disadvantages of the prior art. The present invention provides a method for interworking between a number of video communication terminals, a video communication system, and a video interactive gateway unit.

According to a first aspect of the present invention there is provided a method for interworking between a number of different video communication terminals through a Video Interactive Gateway (VIG) in a video communication system, the video communication system comprising at least one Video Interactive Gateway unit, at least one low bit-rate multimedia terminal, and at least one packet based multimedia terminal, wherein the method comprises the steps of the low bit-rate multimedia terminal sending an Open Logical Channel (OLC) message to the Video Interactive Gateway unit, the Open Logical Channel (OLC) message including a forward channel description and a Reverse channel description, and the Video Interactive Gateway unit further sending and/or receiving messages in order to set up video communication between the terminals, and wherein in setting up video communication between the terminals, the Video Interactive Gateway receives OLC from the packet based multimedia terminal, and the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal.

Preferably, the method further comprises the step of the Video Interactive Gateway unit sending an Open Logical Channel (OLC) rejection message to the low bit-rate multimedia terminal.

Further preferably, when setting up video communication between the terminals, the Video Interactive Gateway initiates OLC towards the packet based multimedia terminal by using the forward channel description received from the low bit-rate multimedia terminal, and the Video Interactive Gateway receives OLC ack from the low bit-rate multimedia terminal and initiates OLC ack towards the packet based multimedia terminal.

Preferably, the Video Interactive Gateway receives OLC ack from the packet based multimedia terminal and sends OLC conf to the low bit-rate multimedia terminal when both OLC ack from the low bit-rate multimedia terminal and OLC ack from the packet based multimedia terminal has been received.

Preferably, in case OLC has not been received from the packet based multimedia terminal, when OLC ack is received from the packet based multimedia terminal, the Video Interactive Gateway initiates OLC to the low bit-rate multimedia terminal by leaving forward channel description empty. More preferably, in case OLC is received from the packet based multimedia terminal later, VIG closes the already opened channel to the low bit-rate multimedia terminal and opens a new one by using the proper forward channel description.

According to a second aspect of the present invention there is provided a method for interworking between a number of different video communication terminals through a Video Interactive Gateway (VIG) in a video communication system, the video communication system comprising at least one Video Interactive Gateway unit, at least one low bit-rate multimedia terminal, and at least one packet based multimedia terminal, wherein the method comprises the steps of the low bit-rate multimedia terminal sending an Open Logical Channel (OLC) message to the Video Interactive Gateway unit, the Open Logical Channel (OLC) message including a forward channel description and a Reverse channel description, and the Video Interactive Gateway unit further sending and/or receiving messages in order to set up video communication between the terminals, and wherein in setting up video communication between the terminals, as the Video Interactive Gateway receives OLC first from the low bit-rate multimedia terminal, it starts a timer, the Video Interactive Gateway receives OLC from the packet based multimedia terminal, the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal, and the Video Interactive Gateway receives OLC ack from the low bit-rate multimedia terminal, initiates OLC ack towards the packet based multimedia terminal, and further initiates OLC towards the packet based multimedia terminal by using the forward channel description received from the low bit-rate multimedia terminal.

Preferably, the method further comprises the step of the Video Interactive Gateway unit sending an Open Logical Channel (OLC) rejection message to the low bit-rate multimedia terminal.

Preferably, the Video Interactive Gateway sends OLC conf to H.324 when OLC ack from the packet based multimedia terminal is received.

Preferably, in case OLC has not been received from the packet based multimedia terminal, when the timer expires, VIG initiates OLC to the low bit-rate multimedia terminal by leaving forward channel description empty. More preferably, in case OLC is received from the packet based multimedia terminal later, VIG closes the already opened channel to the low bit-rate multimedia terminal and opens a new one by using the proper forward channel description.

According to a third aspect of the present invention there is provided a method for interworking between a number of different video communication terminals through a Video Interactive Gateway (VIG) in a video communication system, the video communication system comprising at least one Video Interactive Gateway unit, at least one low bit-rate multimedia terminal, and at least one packet based multimedia terminal, wherein the method comprises the steps of the low bit-rate multimedia terminal sending an Open Logical Channel (OLC) message to the Video Interactive Gateway unit, the Open Logical Channel (OLC) message including a forward channel description and a Reverse channel description, and the Video Interactive Gateway unit further sending and/or receiving messages in order to set up video communication between the terminals, and wherein in setting up video communication between the terminals, the Video Interactive Gateway receives OLC from the packet based multimedia terminal, and the Video Interactive Gateway initiates OLC by using the forward channel description received from the packet based multimedia terminal as forward and reverse channel description towards the low bit-rate multimedia terminal.

Preferably, the method further comprises the step of the Video Interactive Gateway unit sending an Open Logical Channel (OLC) rejection message to the low bit-rate multimedia terminal.

Preferably, in setting up video communication between the terminals, as the Video Interactive Gateway receives OLC first from the low bit-rate multimedia terminal, it starts a timer.

Preferably, in setting up video communication between the terminals, the Video Interactive Gateway receives OLC ack from the low bit-rate multimedia terminal and initiates OLC ack towards the packet based multimedia terminal, and further initiates OLC towards the packet based multimedia terminal by using the forward channel description received from the packet based multimedia terminal.

Preferably, when initiating OLC by using the forward channel description received from the packet based multimedia terminal as reverse channel description towards the low bit-rate multimedia terminal, the Video Interactive Gateway takes into account the request received from the low bit-rate multimedia terminal, and when initiating OLC ack towards the packet based multimedia terminal by using the forward channel description received from the packet based multimedia terminal, the Video Interactive Gateway takes into account the request received from the low bit-rate multimedia terminal.

Preferably, when initiating OLC by using the forward channel description received from the packet based multimedia terminal as reverse channel description towards the low bit-rate multimedia terminal, the Video Interactive Gateway takes into account the capability description received from the low bit-rate multimedia terminal, and when initiating OLC ack towards the packet based multimedia terminal by using the forward channel description received from the packet based multimedia terminal, the Video Interactive Gateway takes into account the capability description received from the low bit-rate multimedia terminal.

Preferably, the Video Interactive Gateway receives OLC ack from the packet based multimedia terminal and sends OLC conf to the low bit-rate multimedia terminal when both OLC ack from the low bit-rate multimedia terminal and OLC ack from the packet based multimedia terminal has been received.

Preferably, in case OLC has not been received from the packet based multimedia terminal, when the timer expires, the Video Interactive Gateway initiates OLC to the packet based multimedia terminal, and as the packet based multimedia terminal acknowledges this, the Video Interactive Gateway initiates OLC to the low bit-rate multimedia terminal by leaving forward channel description empty. More preferably, in case OLC is received from the packet based multimedia terminal later, the Video Interactive Gateway closes the already opened channel to the low bit-rate multimedia terminal and opens a new one by using the proper forward channel description.

Preferably, in any interworking method, the low bit-rate multimedia terminal is a H.324 terminal and that the packet based multimedia terminal is a H.323 terminal. Alternatively, in any interworking method, the low bit-rate multimedia terminal is a H.324 terminal and that the packet based multimedia terminal is a SIP terminal.

According to a fourth aspect of the present invention there is provided a video communication system, the video communication system comprising at least one Video Interactive Gateway unit, at least one low bit-rate multimedia terminal, and at least one packet based multimedia terminal, wherein the low bit-rate multimedia terminal sends an Open Logical Channel (OLC) message to the Video Interactive Gateway unit, the Open Logical Channel (OLC) message including a forward channel description and a Reverse channel description, the Video Interactive Gateway unit further sends and/or receiving messages in order to set up video communication between the terminals, and wherein in setting up video communication between the terminals, the Video Interactive Gateway receives OLC from the packet based multimedia terminal, and the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal.

Preferably, the Video Interactive Gateway unit sends an Open Logical Channel (OLC) rejection message to the low bit-rate multimedia terminal.

Preferably, in setting up video communication between the terminals,
- the Video Interactive Gateway initiates OLC towards the packet based multimedia terminal by using the forward channel description received from the low bit-rate multimedia terminal, and
- the Video Interactive Gateway receives OLC ack from the low bit-rate multimedia terminal and initiates OLC ack towards the packet based multimedia terminal.

According to a fifth aspect of the present invention there is provided a video communication system, the video communication system comprising at least one Video Interactive Gateway unit, at least one low bit-rate multimedia terminal, and at least one packet based multimedia terminal, wherein
- the low bit-rate multimedia terminal sends an Open Logical Channel (OLC) message to the Video Interactive Gateway unit, the Open Logical Channel (OLC) message including a forward channel description and a Reverse channel description, and
- the Video Interactive Gateway unit further sends and/or receiving messages in order to set up video communication between the terminals, and wherein in setting up video communication between the terminals,
- as the Video Interactive Gateway receives OLC first from the low bit-rate multimedia terminal, it starts a timer,
- the Video Interactive Gateway receives OLC from the packet based multimedia terminal,
- the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal, and
- the Video Interactive Gateway receives OLC ack from the low bit-rate multimedia terminal and initiates OLC ack towards the packet based multimedia terminal by using the forward channel description received from the low bit-rate multimedia terminal.

Preferably, the Video Interactive Gateway unit sends an Open Logical Channel (OLC) rejection message to the low bit-rate multimedia terminal.

According to a sixth aspect of the present invention there is provided a video communication system, the video communication system comprising at least one Video Interactive Gateway unit, at least one low bit-rate multimedia terminal, and at least one packet based multimedia terminal, wherein
- the low bit-rate multimedia terminal sends an Open Logical Channel (OLC) message to the Video Interactive Gateway unit, the Open Logical Channel (OLC) message including a forward channel description and a Reverse channel description, and
- the Video Interactive Gateway unit further sends and/or receiving messages in order to set up video communication between the terminals, and wherein in setting up video communication between the terminals,
- the Video Interactive Gateway receives OLC from the packet based multimedia terminal, and
- the Video Interactive Gateway initiates OLC by using the forward channel description received from the packet based multimedia terminal as forward and reverse channel description towards the low bit-rate multimedia terminal.

Preferably, the Video Interactive Gateway unit sends an Open Logical Channel (OLC) rejection message to the low bit-rate multimedia terminal.

Preferably, in setting up video communication between the terminals, as the Video Interactive Gateway receives OLC first from the low bit-rate multimedia terminal, it starts a timer.

Preferably, in setting up video communication between the terminals, the Video Interactive Gateway receives OLC ack from the low bit-rate multimedia terminal and initiates OLC ack towards the packet based multimedia terminal, and further initiates OLC towards the packet based multimedia terminal by using the forward channel description received from the packet based multimedia terminal.

Preferably, in any video communication system, the low bit-rate multimedia terminal is a H.324 terminal and that the packet based multimedia terminal is a H.323 terminal. Alternatively, in any video communication system, the low bit-rate multimedia terminal is a H.324 terminal and that the packet based multimedia terminal is a SIP terminal.

According to a seventh aspect of the present invention there is provided a Video Interactive Gateway unit for interworking between a number of different video communication terminals in a video communication system, the video communication system comprising at least one Video Interactive Gateway unit, at least one low bit-rate multimedia terminal, and at least one packet based multimedia terminal, wherein
- the low bit-rate multimedia terminal sends an Open Logical Channel (OLC) message to the Video Interactive Gateway unit, the Open Logical Channel (OLC) message including a forward channel description and a Reverse channel description, and
- the Video Interactive Gateway unit further sends and/or receiving messages in order to set up video communication between the terminals.

and wherein in setting up video communication between the terminals,
- the Video Interactive Gateway receives OLC from the packet based multimedia terminal, and
- the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal.

Preferably, the Video Interactive Gateway unit sends an Open Logical Channel (OLC) rejection message to the low bit-rate multimedia terminal.

Preferably, in setting up video communication between the terminals,
- the Video Interactive Gateway initiates OLC towards the packet based multimedia terminal by using the forward channel description received from the low bit-rate multimedia terminal, and
- the Video Interactive Gateway receives OLC ack from the low bit-rate multimedia terminal and initiates OLC ack towards the packet based multimedia terminal.

According to a eighth aspect of the present invention there is provided a Video Interactive Gateway unit for interworking between a number of different video communication terminals in a video communication system, the video communication system comprising at least one Video Interactive Gateway unit, at least one low bit-rate multimedia terminal, and at least one packet based multimedia terminal, wherein the low bit-rate multimedia terminal sends an Open Logical Channel (OLC) message to the Video Interactive Gateway unit, the Open Logical Channel (OLC) message including a forward channel description and a Reverse channel description, and the Video Interactive Gateway unit further sends and/or receiving messages in order to set up video communication between the terminals.

and wherein in setting up video communication between the terminals, as the Video Interactive Gateway receives OLC first from the low bit-rate multimedia terminal, it starts a timer, the Video Interactive Gateway receives OLC from the packet based multimedia terminal, the Video Interactive Gateway initiates OLC by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal, and that the Video Interactive Gateway receives OLC ack from the low bit-rate multimedia terminal and initiates OLC ack towards the packet based multimedia terminal by using the forward channel description received from the the low bit-rate multimedia terminal.

Preferably, the Video Interactive Gateway unit sends an Open Logical Channel (OLC) rejection message to the low bit-rate multimedia terminal.

According to a ninth aspect of the present invention there is provided a Video Interactive Gateway unit for interworking between a number of different video communication terminals in a video communication system, the video communication system comprising at least one Video Interactive Gateway unit, at least one low bit-rate multimedia terminal, and at least one packet based multimedia terminal, wherein the low bit-rate multimedia terminal sends an Open Logical Channel (OLC) message to the Video Interactive Gateway unit, the Open Logical Channel (OLC) message including a forward channel description and a Reverse channel description, and the Video Interactive Gateway unit further sends and/or receiving messages in order to set up video communication between the terminals.

and wherein in setting up video communication between the terminals, the Video Interactive Gateway receives OLC from the packet based multimedia terminal, and the Video Interactive Gateway initiates OLC by using the forward channel description received from the packet based multimedia terminal as forward and reverse channel description towards the low bit-rate multimedia terminal.

Preferably, the Video Interactive Gateway unit sends an Open Logical Channel (OLC) rejection message to the low bit-rate multimedia terminal.

Preferably, in setting up video communication between terminals, as the Video Interactive Gateway receives OLC first from the low bit-rate multimedia terminal, it starts a timer.

Preferably, in setting up video communication between the terminals, the Video Interactive Gateway receives OLC ack from the low bit-rate multimedia terminal and initiates OLC ack towards the packet based multimedia terminal, and further initiates OLC towards the packet based multimedia terminal by using the forward channel description received from the packet based multimedia terminal.

Preferably, in any Video Interactive Gateway unit, the low bit-rate multimedia terminal is a H.324 terminal and that the packet based multimedia terminal is a H.323 terminal. Alternatively, in any Video Interactive Gateway unit, the low bit-rate multimedia terminal is a H.324 terminal and that the packet based multimedia terminal is a SIP terminal.

DETAILED DESCRIPTION OF CERTAIN EMBODIMENTS

The solution according to the present invention presents a new method for interworking between a number of video communication terminals, a new video communication system, and a new video interactive gateway unit.

The fundamental idea behind the solution is always ignore the reverse channel description from the H.324 terminal and reject the bi-directional OLC procedure initiated by it and to use the forward channel description received from the H.323 terminal.

For a better understanding of the present invention and in order to show how the same may be carried into effect reference will now be made to the accompanying drawings, in which.

The FIGS. 1 to 4 referring to the prior art have been discussed earlier. In the following, reference is made to the FIGS. 5-8.

Figure 5:
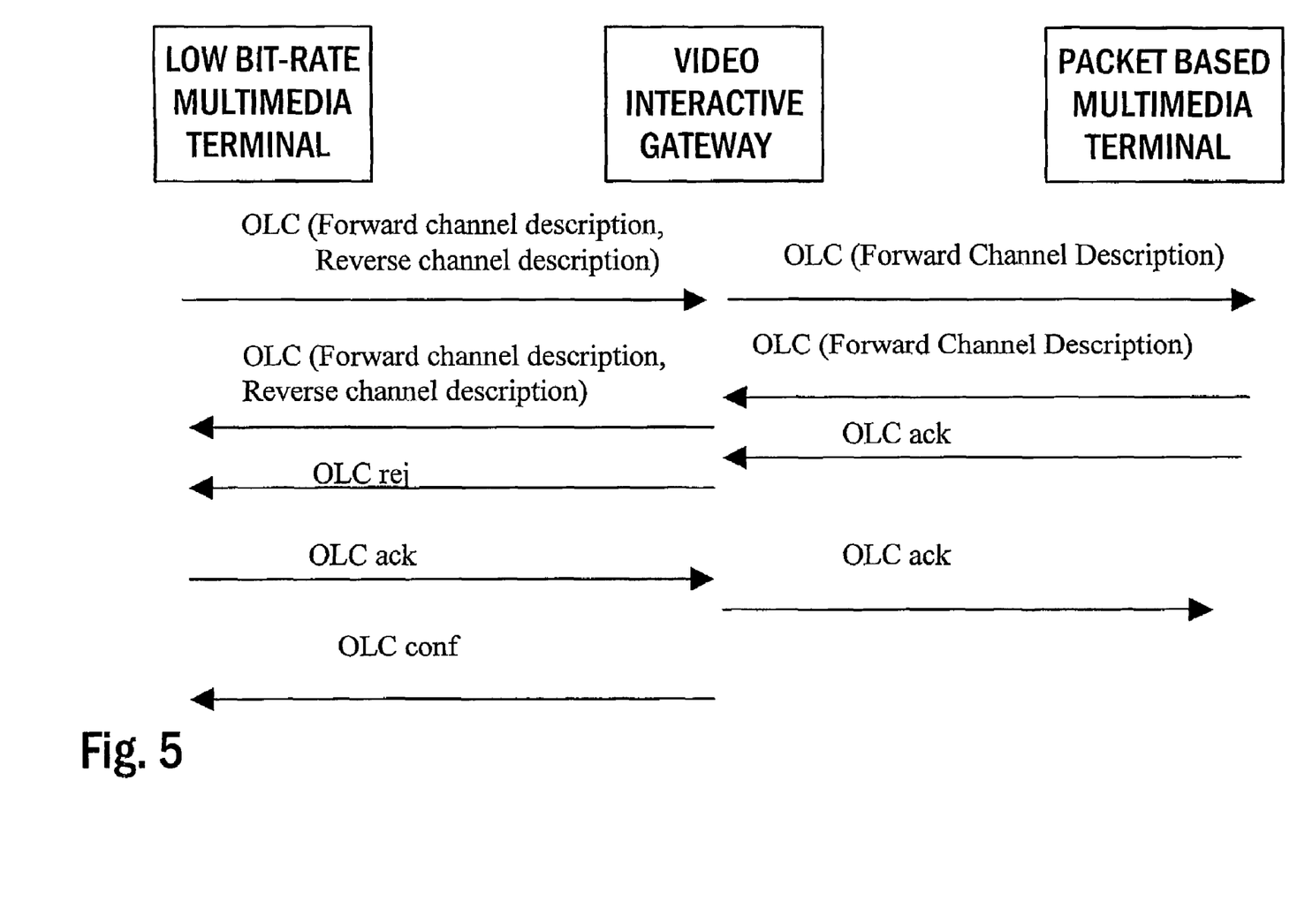
FIG. 5 illustrates one example of Interworking between Bi-directional Logical Channel signalling procedures and Uni-directional Logical Channel signalling procedures according to the present invention.

FIG. 5 illustrates one example of Interworking between Bi-directional Logical Channel signalling procedures and Uni-directional Logical Channel signalling procedures according to the present invention. The FIG. 5 shows sequence diagram of the mapping.

If OLC is received from H.324 terminal first in VIG, VIG rejects the request and initiates OLC towards H.323 terminal by using the forward channel description received from the H.324 terminal.

VIG receives OLC from H.323 terminal. VIG initiates OLC by using the forward channel description received from H.323 terminal as forward channel description towards H.324 terminal; and by using the forward channel description received from the H.324 terminal as the reverse channel description towards H.324 terminal.

VIG receives OLC ack from H.324. This initiates OLC ack towards H.323 terminal. From now on, H.323 may transmit media.

VIG sends OLC conf to H.324 when both OLC ack from H.324 terminal and OLC ack from H.323 terminal has been received.

If OLC has not been received from H.323 terminal, when OLC ack is received from H.323 terminal, VIG initiates OLC to H.324 terminal by leaving forward channel description empty. This may happen if H.323 may not wish or is able to send video, e.g. because of lack of camera.

However, if OLC is received from H.323 terminal later, VIG closes the already opened channel to H.324 terminal and opens a new one by using the proper forward channel description.

In the presented solution according to the present invention, VIG initiates OLC towards H.323 terminal before it receives OLC ack from H.324 terminal. This means that VIG needs to generate and map logical channel numbers in the messages between terminals.

Figure 6:
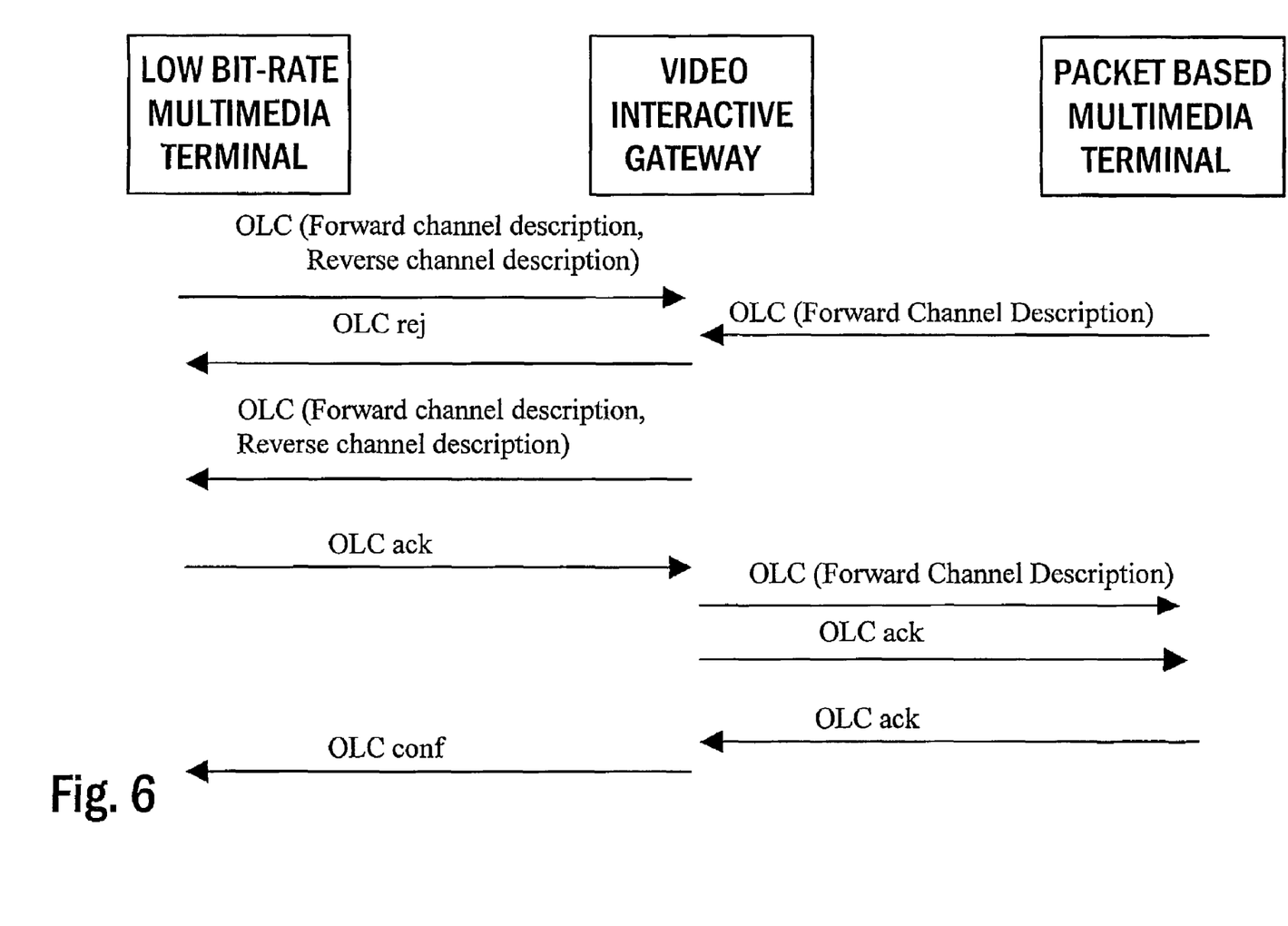
FIG. 6 illustrates another example of Interworking between Bi-directional Logical Channel signalling procedures and Uni-directional Logical Channel signalling procedures according to the present invention.

FIG. 6 illustrates another example of Interworking between Bi-directional Logical Channel signalling procedures and Uni-directional Logical Channel signalling procedures according to the present invention. The FIG. 6 shows sequence diagram of the mapping.

In this second Interworking example there is difference in timing. If OLC is received from H.324 terminal first in VIG, VIG rejects the request and starts a timer.

VIG receives OLC from H.323 terminal. VIG initiates OLC by using the forward channel description received from H.323 terminal as forward channel description towards H.324 terminal; and by using the forward channel description received from the H.324 terminal as the reverse channel description towards H.324 terminal.

VIG receives OLC ack from H.324. This initiates OLC ack towards H.323 terminal and this initiates OLC towards H.323 terminal by using the forward channel description received from the H.324 terminal. From now on, H.323 may transmit media.

VIG sends OLC conf to H.324 when OLC ack from H.323 terminal is received.

If OLC has not been received from H.323 terminal, when the timer expires, VIG initiates OLC to H.324 terminal by leaving forward channel description empty. This may happen if H.323 may not wish or is able to send video, e.g. because of lack of camera.

However, if OLC is received from H.323 terminal later, VIG closes the already opened channel to H.324 terminal and opens a new one by using the proper forward channel description.

In this second solution according to the present invention, there is a timer, which delays the set-up a little bit in case H.323 terminal do not initiates OLC.

Figure 7:
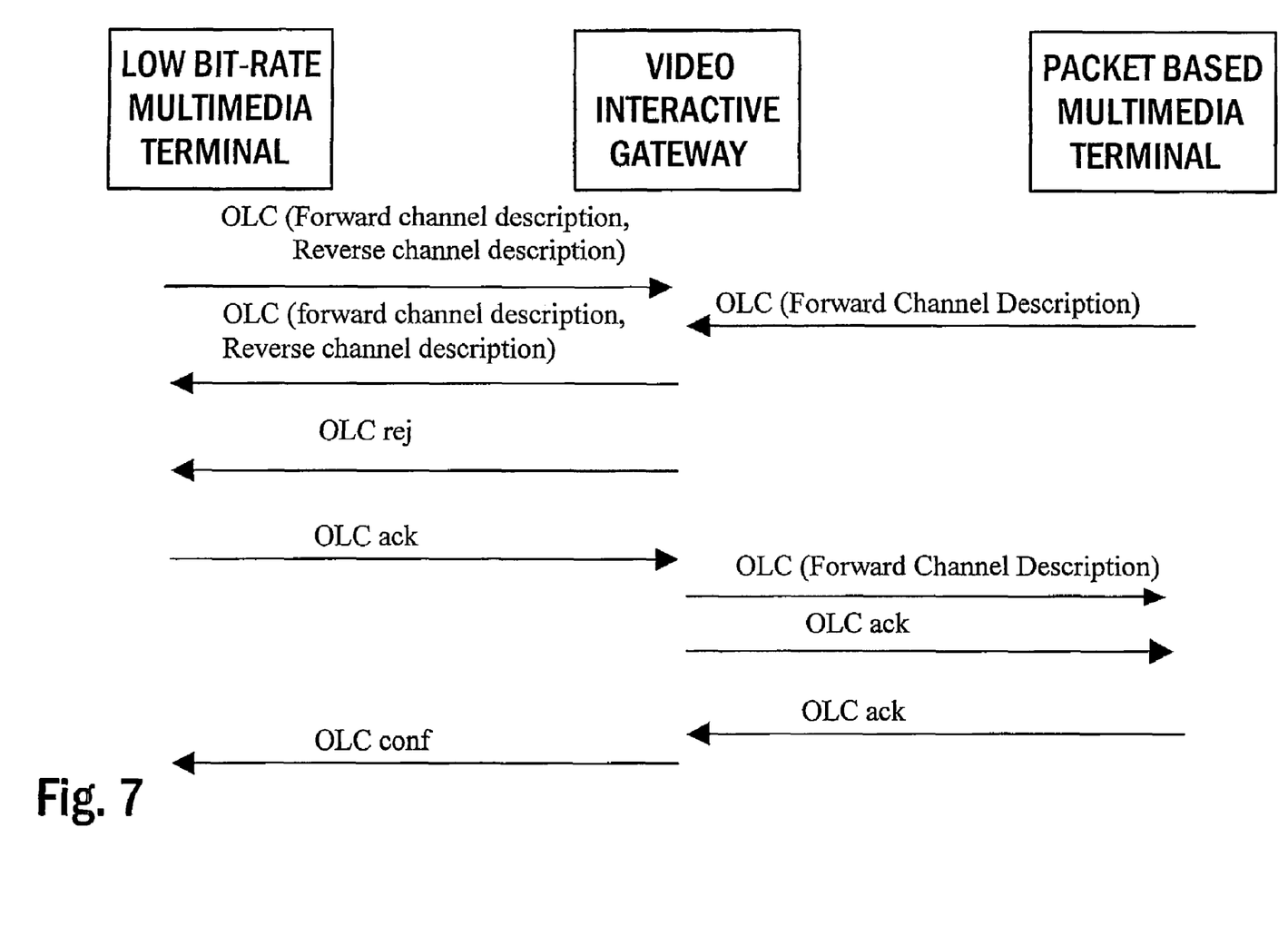
FIG. 7 illustrates a third example of Interworking between Bi-directional Logical Channel signalling procedures and Uni-directional Logical Channel signalling procedures according to the present invention.

FIG. 7 illustrates a third example of Interworking between Bi-directional Logical Channel signalling procedures and Uni-directional Logical Channel signalling procedures according to the present invention. The FIG. 7 shows sequence diagram of the mapping.

The fundamental idea in the third Interworking example is to use Forward Channel Description from H.323 terminal for both channels. If OLC is received from H.324 terminal first in VIG, VIG starts a timer.

VIG receives OLC from H.323 terminal. VIG initiates OLC by using the forward channel description received from H.323 terminal as forward and reverse channel description towards H.324 terminal. VIG also rejects the original request from H.324 terminal.

VIG receives OLC ack from H.324. This initiates OLC ack towards H.323 terminal and this initiates OLC towards H.323 terminal by using the forward channel description received from the H.324 terminal. From now on, H.323 may transmit media.

VIG sends OLC conf to H.324 when OLC ack from H.323 terminal is received.

If OLC has not been received from H.323 terminal, when the timer expires, VIG initiates OLC to H.323 terminal. When H.323 acknowledges this, VIG initiates OLC to H.324 terminal by leaving forward channel description empty. This may happen if H.323 may not wish or is able to send video, e.g. because of lack of camera.

However, if OLC is received from H.323 terminal later, VIG closes the already opened channel to H.324 terminal and opens a new one by using the proper forward channel description.

In this third solution according to the present invention, it possible to use the same video channel properties, e.g. video codec options in both directions of video channels.

Figure 8:
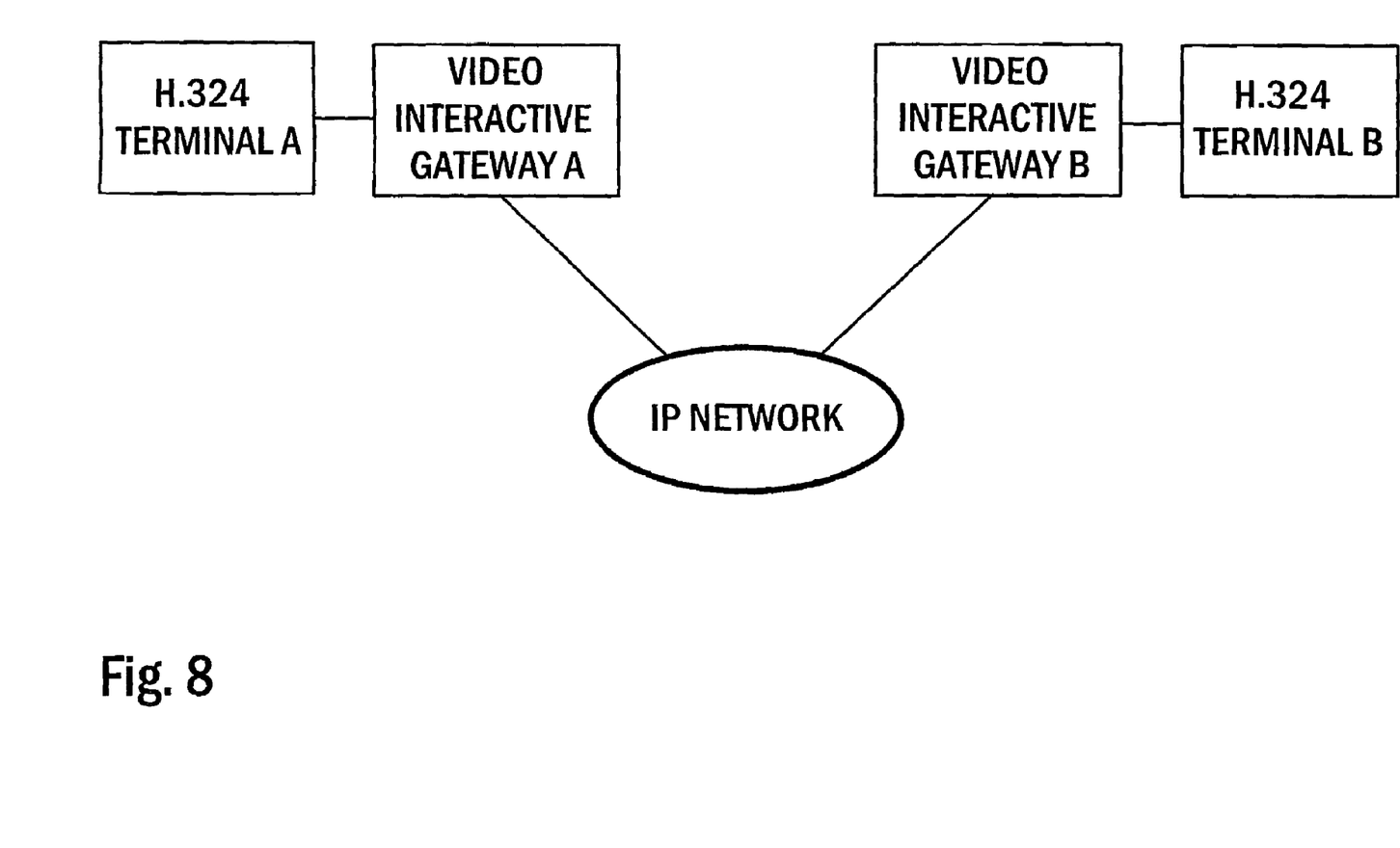
FIG. 8 illustrates Interworking between Bi-directional Logical Channel signalling procedures and Uni-directional Logical Channel signalling procedures according to prior art.

FIG. 8 illustrates a videoconference trunking over IP network according to the present invention.

When IP network is desired to be used for trunking calls between two H.324 terminals, the call chain contains two VIGs as seen in the FIG. 8. This creates a potential problems to the solutions described above.

It could happen that H.324 terminal A triggers the bi-directional OLC signalling first. This would be mapped to uni-directional OLC signalling by VIG A. This would trigger VIG B to initiated bi-directional OLC signalling to H.324 terminal B. If OLC is received by H.324 terminal B before it would initiate it's own OLC procedure towards VIG B, the video channel from H.324 terminal B to H.324 terminal A would not be established. Therefore a solution to overcome this problem is needed and shown below.

The idea to solve the problem above is to not perform mapping between bi-directional OLC signalling procedures and uni-directional OLC procedures in case of trunking. In order to know that VIG is involved in trunking, it uses the end-point-type information in H.323 call control signalling H.225. If that information contains information about gateway as an end-point, VIG interprets this as an indication that trunking is the case and thus VIG will pass bi-directional logical channel signalling through IP-network.

The present solution makes it possible to interwork between different terminals e.g. between a low bit-rate multimedia terminal and a packet based multimedia terminal.

It makes it possible to inter-work between H.323 terminal and H.324 terminal by using just the mandatory parts of the respectively specifications.

The invention claimed:
1. A method of interworking between dissimilar multimedia terminals through a Video Interactive Gateway (VIG) unit in a video communication system, the video communication system comprising at least one Video Interactive Gateway unit, at least one low bit-rate multimedia terminal, and at least one packet based multimedia terminal, the method comprising the steps of the low bit-rate multimedia terminal sending a first Open Logical Channel (OLC) message to the Video Interactive Gateway unit, the first OLC message including a forward channel description and a Reverse channel description, and the Video Interactive Gateway unit sending and receiving messages to set up video communication between the multimedia terminals, wherein the step of setting up video communication between the multimedia terminals, includes:

the Video Interactive Gateway receiving a second OLC message from the packet based multimedia terminal, and the Video Interactive Gateway initiating a modified OLC message by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal.

2. The interworking method according to claim 1, further comprising the step of the Video Interactive Gateway unit sending an OLC rejection message to the low bit-rate multimedia terminal.

3. The interworking method according to claim 1, further comprising, when setting up video communication between the terminals, the Video Interactive Gateway receiving an OLC ack message from the low bit-rate multimedia terminal and initiating the OLC ack message towards the packet based multimedia terminal.

4. The interworking method according to claim 1 further comprising the Video Interactive Gateway receiving the OLC ack message from the packet based multimedia terminal and sending an OLC conf message to the low bit-rate multimedia terminal when both the OLC ack message from the low bit-rate multimedia terminal and the OLC ack message from the packet based multimedia terminal have been received.

5. The interworking method according to claim 1 wherein upon receipt of the modified OLC message, the Video Interactive Gateway initiating the modified OLC message to the low bit-rate multimedia terminal by leaving forward channel description empty.

6. The interworking method according to claim 1, wherein the low bit-rate multimedia terminal is a H.324 terminal and that the packet based multimedia terminal is a H.323 terminal or a SIP terminal.

7. A method for interworking between different video communication terminals through a Video Interactive Gateway (VIG) in a video communication system, the video communication system comprising at least one Video Interactive Gateway unit, at least one low bit-rate multimedia terminal, and at least one packet based multimedia terminal, the method comprising the steps of the low bit-rate multimedia terminal sending a first Open Logical Channel (OLC) message to the Video Interactive Gateway unit, the first OLC message including a forward channel description and a Reverse channel description, and the Video Interactive Gateway unit sending and receiving messages for setting up video communication between the different video communication terminals, comprising the steps of:

starting a timer when the Video Interactive Gateway receives the first OLC message from the low bit-rate multimedia terminal, the Video Interactive Gateway receiving the second OLC message from the packet based multimedia terminal, the Video Interactive Gateway initiating a modified OLC message by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal, and the Video Interactive Gateway receiving an OLC ack message from the low bit-rate multimedia terminal, initiating an OLC ack message towards the packet based multimedia terminal, and further, initiating an OLC message towards the packet based multimedia terminal by using the forward channel description received from the low bit-rate multimedia terminal, wherein in case the second OLC message has not been received from the packet based multimedia terminal when the timer expires, the Video Interactive Gateway initiates the modified OLC message to the low bit-rate multimedia terminal by leaving the forward channel description empty, and wherein in case the second OLC message is received from the packet based multimedia terminal later, the Video Interactive Gateway closes the already opened channel to the low bit-rate multimedia terminal and opens a new channel by using the proper forward channel description.

8. The interworking method according to claim 7, wherein the method further comprises the step of the Video Interactive Gateway unit sending an OLC rejection message to the low bit-rate multimedia terminal.

9. The interworking method according to claim 7 wherein the Video Interactive Gateway sends an OLC conf message to H.324 when the OLC ack message from the packet based multimedia terminal is received.

10. The interworking method according to claim 7, wherein the low bit-rate multimedia terminal is a H.324 terminal and that the packet based multimedia terminal is a H.323 terminal or a SIP terminal.

11. A method for interworking between different video communication terminals through a Video Interactive Gateway (VIG) in a video communication system, the video communication system comprising at least one Video Interactive Gateway unit, at least one low bit-rate multimedia terminal, and at least one packet based multimedia terminal, the method comprising the steps of:

the low bit-rate multimedia terminal sending a first Open Logical Channel (OLC) message to the Video Interactive Gateway unit, the first OLC message including a forward channel description and a Reverse channel description, and the Video Interactive Gateway unit sending and receiving messages for setting up video communication between the different video communication terminals, the Video Interactive Gateway receiving a second OLC message from the packet based multimedia terminal, and the Video Interactive Gateway initiating a modified OLC message by using the forward channel description received from the packet based multimedia terminal as forward and reverse channel description towards the low bit-rate multimedia terminal, wherein the step of the Video Interactive Gateway sending and receiving messages further comprises:

the Video Interactive Gateway receiving an OLC ack message from the low bit-rate multimedia terminal and initiating the OLC ack message towards the packet based multimedia terminal by using the forward channel description received from the packet based multimedia terminal, the Video Interactive Gateway taking into account the request received from the low bit-rate multimedia terminal, and the Video Interactive Gateway initiating a modified OLC message towards the packet based multimedia terminal by using the forward channel description received from the packet based multimedia terminal as reverse channel description towards the low bitrate multimedia terminal, the Video Interactive Gateway taking into account the request received from the low bitrate multimedia terminal.

12. The interworking method according to claim 11, further comprising the step of the Video Interactive Gateway unit sending an Open Logical Channel (OLC) rejection message to the low bit-rate multimedia terminal.

13. The interworking method according to claim 11, further comprising the step of starting a timer when the Video Interactive Gateway receives the first OLC message first from the low bit-rate multimedia terminal.

14. The interworking method according to claim 11, further comprising the steps of:

initiating the modified OLC message by using the forward channel description received from the packet based multimedia terminal as reverse channel description towards the low bit-rate multimedia terminal, the Video Interactive Gateway taking into account the capability description received from the low bit-rate multimedia terminal, and initiating OLC ack message towards the packet based multimedia terminal by using the forward channel description received from the packet based multimedia terminal, the Video Interactive Gateway taking into account the capability description received from the low bit-rate multimedia terminal.

15. The interworking method according to claim 14, further comprising the Video Interactive Gateway receiving the OLC ack message from the packet based multimedia terminal and sending an OLC conf message to the low bit-rate multimedia terminal when both the OLC ack message from the low bit-rate multimedia terminal and the OLC ack message from the packet based multimedia terminal has been received.

16. The interworking method according to claim 14, wherein if the second OLC message has not been received from the packet based multimedia terminal, when the timer expires, the Video Interactive Gateway initiating the modified OLC message to the packet based multimedia terminal, and as the packet based multimedia terminal acknowledges this, the Video Interactive Gateway initiating the modified OLC message to the low bit-rate multimedia terminal by leaving forward channel description empty.

17. The interworking method according to claim 11, wherein the low bit-rate multi-media terminal is a H.324 terminal and that the packet based multimedia terminal is a SIP terminal or a H.323 terminal.

18. A Video Interactive Gateway unit for interworking between dissimilar multimedia terminals in a video communication system, the video communication system comprising at least one Video Interactive Gateway unit, at least one low bit-rate multimedia terminal, and at least one packet based multimedia terminal, the Video Interactive Gateway unit comprising:

means for receiving from the low bit-rate multimedia terminal a first Open Logical Channel(OLC) message to the Video Interactive Gateway unit, the first OLC message including a forward channel description and a Reverse channel description, and means for sending and receiving messages to set up video communication between the dissimilar multimedia terminals;

means for receiving a second OLC message from the packet based multimedia terminal, and means for initiating a modified OLC message by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal.

19. The Video Interactive Gateway unit according to claim 18, further comprising means for sending an Open Logical Channel (OLC) rejection message to the low bit-rate multimedia terminal.

20. The Video Interactive Gateway unit according to claim 18, further comprising:

means for initiating the modified OLC message towards the packet based multimedia terminal by using the forward channel description received from the low bit-rate multimedia terminal;

means for initiating the OLC ack message from the low bit-rate multimedia terminal; and means for initiating the OLC ack message towards the packet based multimedia terminal.

21. The Video Interactive Gateway unit according to claim 18, wherein the low bit-rate multimedia terminal is a H.324 terminal and that the packet based multimedia terminal is a H.323 terminal or a SIP terminal.

22. A Video Interactive Gateway unit for interworking between different video communication terminals in a video communication system, the video communication system comprising at least one Video Interactive Gateway unit, at least one low bit-rate multimedia terminal, and at least one packet based multimedia terminal, the Video Interactive Gateway unit comprising means for receiving from the low bit-rate multimedia terminal, a first Open Logical Channel (OLC) message to the Video Interactive Gateway unit, the first OLC message including a forward channel description and a Reverse channel description, means for sending and receiving messages to set up video communication between the video communication terminals, means for starting a timer when the Video Interactive Gateway receives the first OLC message from the the low bit-rate multimedia terminal, means for receiving the second OLC message from the packet based multimedia terminal, means for initiating a modified OLC message by using the forward channel description received from the packet based multimedia terminal as forward channel description towards the low bit-rate multimedia terminal, and by using the forward channel description received from the low bit-rate multimedia terminal as the reverse channel description towards the low bit-rate multimedia terminal, and means for receiving an OLC ack message from the low bit-rate multimedia terminal and initiating the OLC ack message towards the packet based multimedia terminal by using the forward channel description received from the low bit-rate multimedia terminal.

23. The Video Interactive Gateway unit according to claim 22, further comprising
means for sending an Open Logical Channel (OLC) rejection message to the low bit-rate multimedia terminal.

24. The Video Interactive Gateway unit according to claim 22, wherein the low bit-rate multimedia terminal is a H.324 terminal and that the packet based multimedia terminal is a H.323 terminal or a SIP terminal.

25. A Video Interactive Gateway unit for interworking between dissimilar multimedia terminals in a video communication system, the video communication system comprising at least one Video Interactive Gateway unit, at least one low bit-rate multimedia terminal, and at least one packet based multimedia terminal, the Video Interactive Gateway comprising:
means for receiving a first Open Logical Channel (OLC) message from the low bit-rate multimedia terminal, the first OLC message including a forward channel description and a Reverse channel description, and
means for sending and receiving messages in order to set up video communication between the dissimilar multimedia terminals;
means for receiving a second OLC message from the packet based multimedia terminal, and
means for initiating a modified OLC message by using the forward channel description received from the packet based multimedia terminal as forward and reverse channel description towards the low bit-rate multimedia terminal.

26. The Video Interactive Gateway unit according to claim 25, wherein the Video Interactive Gateway unit sends an OLC rejection message to the low bit-rate multimedia terminal.

27. The Video Interactive Gateway unit according to claim 25 further comprising means for starting a timer when the Video Interactive Gateway receives the first OLC message from the low bitrate multimedia terminal.

28. The Video Interactive Gateway unit according to claim 25, further comprising:
means for receiving the OLC ack message from the low bit-rate multimedia terminal and initiating the OLC ack message towards the packet based multimedia terminal, and initiating the modified OLC message towards the packet based multimedia terminal by using the forward channel description received from the packet based multimedia terminal.

29. The Video Interactive Gateway unit according to claim 28, wherein the low bit-rate multimedia terminal is a H.324 terminal and the packet based multimedia terminal is a H.323 terminal or a SIP terminal.

* * * * *